United States Patent [19]

Jackson

[11] 4,220,178
[45] Sep. 2, 1980

[54] MOMENTUM BALANCE SPOOL

[75] Inventor: Alan D. Jackson, Hutchinson, Kans.

[73] Assignee: The Cessna Aircraft Company, Wichita, Kans.

[21] Appl. No.: 7,873

[22] Filed: Jan. 31, 1979

[51] Int. Cl.³ .............................................. F16K 3/22
[52] U.S. Cl. ............................ 137/625.3; 137/625.69; 251/282; 251/324
[58] Field of Search ..................... 137/625.3, 625.69; 251/282, 324

[56] References Cited

U.S. PATENT DOCUMENTS

| 2,747,612 | 5/1956 | Lee .................................... 251/282 X |
| 2,765,378 | 10/1956 | Perry et al. .................. 137/625.69 X |
| 2,987,050 | 6/1961 | Oppenheimer et al. ..... 137/625.69 X |
| 4,155,535 | 5/1979 | Seamone ...................... 137/625.69 X |

FOREIGN PATENT DOCUMENTS 841730 7/1960 United Kingdom .
1056533 1/1967 United Kingdom ................ 137/625.69

Primary Examiner—Gerald A. Michalsky

[57] ABSTRACT

This invention is a specific method for shaping the shank of a hydraulic control valve spool to alter the momentum exchange from high pressure fluid flowing across the spool so as to balance the various dynamic forces acting on the spool. The shank is shaped to turn the high velocity stream away from the spool at a lesser angle than the entry angle of the stream while utilizing conventional square-edge lands.

10 Claims, 2 Drawing Figures

MOMENTUM BALANCE SPOOL

BACKGROUND OF THE INVENTION

The present invention relates to hydraulic flow control valves of the spool type and more particularly to the problems of spool effort while actuating the valve in a metering condition. In many applications, a spool valve is required to control the flow of high pressure fluid either from a pump source to a motor function, or the reverse when lowering a heavy load.

One of the goals in designing spool-type valves since their inception, has been to hydraulically balance the forces on the valve spool so as to minimize the operator effort. While a valve spool may balanced in a static condition once fluid begins to flow across the valve, the forces on the spool change and a balanced condition no longer exists. When a vlave spool is in a metering condition and the pressure drop across the spool becomes substantial, the previously balanced hydraulic forces become imbalanced and the valve is difficult to manually control. There are a variety of different changing dynamic forces acting on the spool such as the often-mentioned "Bernoulli effect". Another dynamically-created force on the spool is the momentum exchange which is varied in accordance with the entry and exhaust angle of the high speed stream flowing across the spool. An example of the momentum gain concept is illustrated an discussed in U.S. Pat. No. 2,747,612. In that patent, the Bernoulli effect on the spool attempts to close the valve by moving the spool to the right, while the momentum gain attempts to hold the valve open or move the spool to the left. A similar configuration is also shown and discussed in detail in British patent No. 841,730 wherein the momentum concept is carried further with a recirculating effect on the valve spool to force it towards the open position.

Various shapes of notches in the metering land have been utilized over the years in dealing with the same problems of minimizing spool effort. Typical of these patents would be U.S. Pat. to Wilke, No. 3,729,026; U.S. Pat. to Juncke, et al, No. 2,971,536; Miller, No. 3,009,480; Darling, No. 3,123,335, and Tolbert, No. 3,747,642. All of these last-mentioned patents refer to a throttle notch configuration of some form which have limited utility so long as the metering is only across the notch and have very little value for wider open valve spool positions when there is fluid flowing across the spool land.

SUMMARY OF THE INVENTION

The present invention applies the axial momentum gain principle in various metering positions of the spool. It utilizes a circumferential turning surface on the shank of the spool in conjunction with a conventional square-edge metering land. Any spool land which is not a conventional square-edge is difficult to manufacture and the timing tolerance problems are substantial.

The exit ramp in the present invention is shortened so that flow across the spool can be handled without the requirement of an additional cavity surrounding the exit ramp, as required in the prior art.

Another object of the present invention is to provide a valve spool design with balance dynamic forces thereon which can be utilized in conventional valve body castings.

Another object of the present invention is to provide a spool design utilizing a momentum exchange concept for balancing the dynamic forces on the spool with conventional square-edged spool lands.

These and other more particular objects and advantages of the present invention are specifically set forth and will become apparent from the following detailed description of the preferred form of the invention when read in conjunction with the accompanying drawings.

BRIEF DESCRIPTION OF THE DRAWINGS

The accompanying drawing illustrates two embodiments of the invention for practicing the principles of the present invention and in which.

DESCRIPTION OF THE PREFERRED EMBODIMENTS

Figure 1:
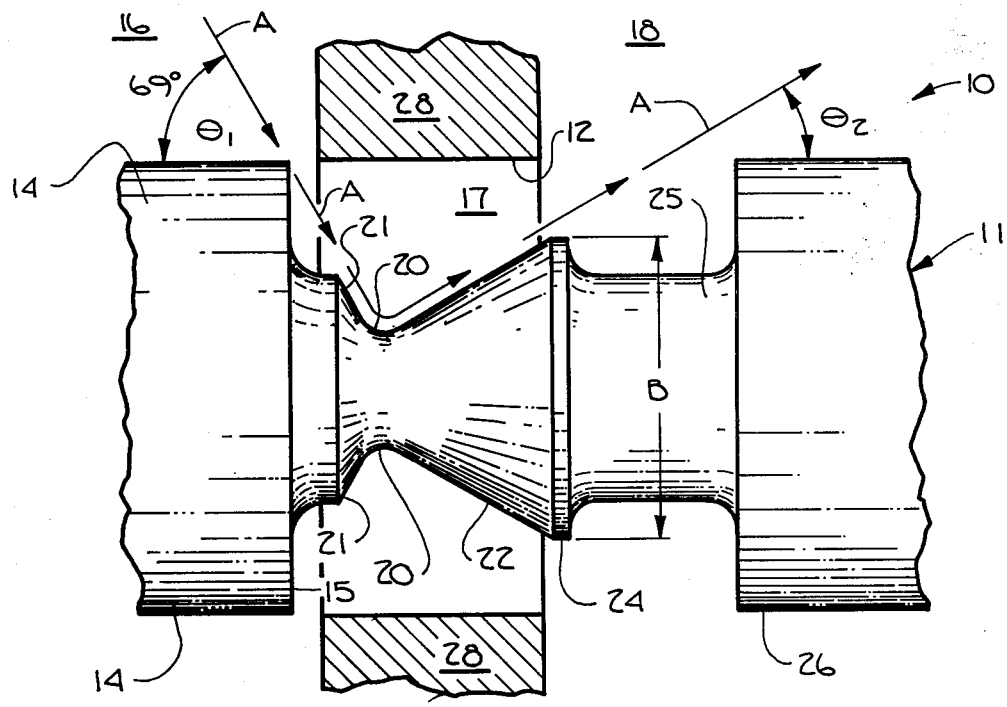
FIG. 1 is a partial side view of a valve spool incorporating the present invention.

Referring now to the accompanying drawings and more particularly to FIG. 1, reference numeral 10 generally designates a control valve comprising a spool 11 longitudinally slidable in valve body bore 12. The drawing illustrates only a portion of a typical spool which has numerous other lands of a like or different nature along with adjacent cavities in the valve body. The valve body, not shown, includes a land 28, also referred to as a casting land, and is illustrative merely as one of the valve body lands between a pressurized supply cavity 16 and a return cavity 18. Cavity 16 could likewise be a work port cavity. Valve spool 11 includes a metering land 14 separated from downstream land 26 by a metering groove 17. The groove 17 is partially defined by spool shank 25. Formed on the shank of the spool 11 is a turning surface 20 which includes an entry ramp 21 and an exit ramp 22. The turning surface 20 is longitudinally positioned on the spool so that the high velocity stream A entering the groove 17 will be turned approximately 90 degrees so that the stream A exits the spool bore at an angle $\theta_2$. The high velocity stream passing over land 14 into the groove 17 will enter at an angle of 69 degrees regardless of the land opening. The turning angle on the spool shank is between 60 and 90 degrees with an optimum of 80 degrees. The exit ramp 22 terminates at a maximum diameter B which varies with the pressure drop requirements of the particular valve. The annular area defined between the valve bore and maximum exit ramp diameter is illustrated at approximately 50 percent of the bore area. Since the length of the exit ramp 22 is not critical to the invention, the ramp can be shortened or lengthened from that illustrated in in the drawing to meet whatever pressure drop requirements are necessary in the particular valve application. The downstream portion of the spool shank 25 from the exit ramp is of a reduced diameter with no particular effect on the operation of the spool. However, the downstream spool land 26 cannot be moved upstream into the path of the high velocity stream A without disturbing the momentum gain. High velocity stream A exits the valve bore 12 at an angle $\theta_2$, which is between 20 and 50 degrees with the spool axis. Both metering land 14 and downstream land 26 are square-edged so that conventional means can be utilized to form the spool while maintaining a high tolerance of land timing.

Figure 2:
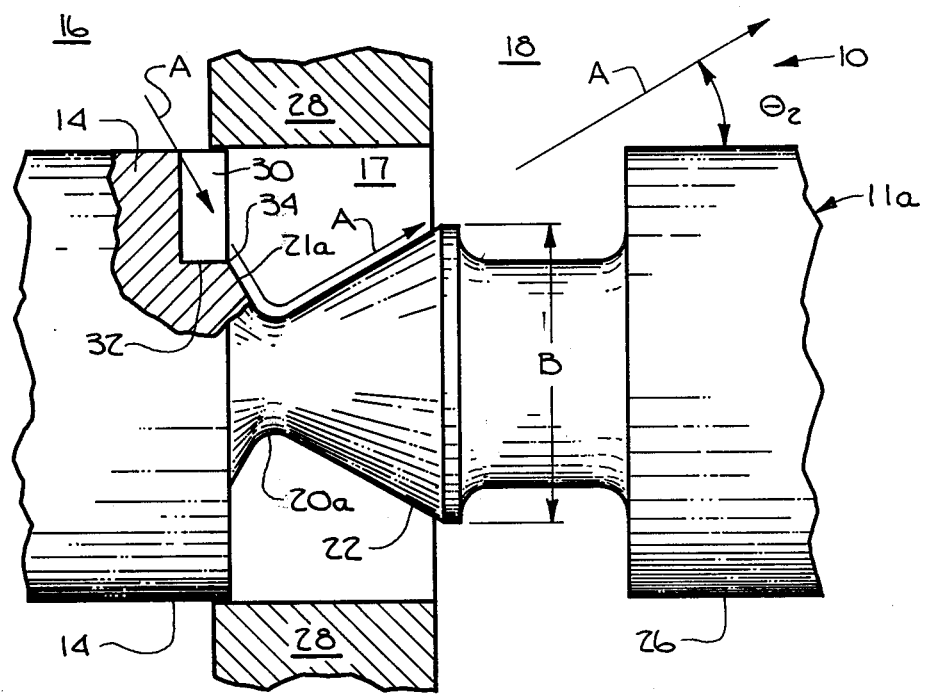
FIG. 2 is a partial side view of a valve spool in partial section illustrating a different embodiment of the present invention.

FIG. 2 illustrates a slightly modified spool 11a which incorporates a pair of throttle notches 30. Throttle notch 30 has sufficient depth so that the high velocity stream A will not be interrupted by the leading edge 34 of the bottom surface 32 of the notch. The entry ramp 21a of the circumferential turning surface 20a is positioned in close proximity to the high velocity stream A so that it turns the undisturbed stream, directing it outwardly on the exit ramp 22 at an angle $\theta_2$ with respect to the spool axis. Exit ramp 22 is cut short with a maximum diameter B, so as to provide ample annular space between the valve bore and the spool for the fluid to pass across the groove 17 without creating an excessive pressure drop with the spool in a full flow position. When the high velocity stream enters the spool groove at a steeper angle than it exits, there is a momentum exchange on the spool with a net resultant force urging the spool to the left, as shown in the drawing, in an effort to open the valve. This momentum-induced force cancels out those other factor imbalances on the spool which are attempting to close the valve or move the valve spool to the right, as shown in the drawing. These other forces include the forces due to the Bernoulli effect and surface drag.

Valve spool 11 illustrated in FIG. 1 is shown in a metering position with the high velocity stream A passing across the metering land 14 at an angle which is substantially 69 degrees. The high velocity stream continues until it comes in contact with the turning surface 20 whereupon the high velocity stream is deflected outwardly toward the O.D. of the spool at an angle of $\theta_2$ to the spool axis. The high velocity stream clears the next downstream land 26 and diminishes in drain cavity 18. The momentum exchange on the spool has a net effect of urging the spool to the left towards its open position to counteract the Bernoulli effect and surface drag, both of which are acting in the opposite direction.

From the foregoing description, together with the accompanying drawings, it will be readily apparent to those skilled in the art that this invention provides a method of shaping the shank of a valve spool to alter the momentum exchange from the fluid flowing thereacross in such a way as to reduce the mechanical force necessary to overcome the dynamic forces created by the Bernoulli effect and surface drag of fluid flowing across the spool.

Having described the invention with sufficient clarity to enable those familiar with the art to construct and use it, I claim:

1. In a control valve having a valve spool with alternately spaced grooves and lands, and a conventional body having a bore in which the spool is slidable from a closed position to at least one metering position providing restricted flow from a pressurized cavity in the body across a spool groove to an exhaust cavity in the body, the improvement comprising:
    a metering land cut approximately 90 degrees on the valve spool;
    the metering groove on the valve spool having a circumferential turning surface longitudinally positioned to intercept the high velocity stream entering the groove across the metering land;
    a circumferential diverging exit ramp tangentially positioned adjacent the turning surface; the exit ramp terminating with a maximum diameter forming an annular opening with the bore.

2. A control valve as set forth in claim 1, wherein the turning surface on the metering groove diverts the stream between 60 and 90 degrees and the high velocity stream entering the metering groove is approximately 69 degrees from the axis of the spool.

3. A control valve as set forth in claim 1, wherein the exit ramp is located between 20 and 50 degrees from the spool axis and the next downstream land on the spool is positioned outside the high velocity stream.

4. A control valve as set forth in claim 1, wherein the maximum diameter of the exit ramp is such that the annular opening formed is at least 25 percent of the valve bore area.

5. A control valve as set forth in claim 1, wherein the turning surface of the metering groove diverts the stream approximately 80 degrees.

6. A control valve as set forth in claim 1, wherein both the metering land on the spool and the casting land on the valve body are square-edged.

7. A control valve as set forth in claim 1, including a notch in the edge of the metering land, the notch having sufficient depth so that the leading edge of the bottom surface of the notch does not encounter the high velocity stream passing through the notch.

8. A control valve as set forth in claim 1, including at least two notches in the edge of the metering land, the notches being substantially square-edged and having sufficient depth so that the leading edge of the bottom surface of each notch does not encounter the high velocity stream passing through the notches.

9. A control valve as set forth in claim 1, wherein the turning surface includes an entry ramp positioned approximately 69 degrees from the axis of the spool.

10. An improved valve spool design having reduced spool operating forces utilized in a conventional valve body comprising:
    a circumferential square-edged metering land;
    a metering groove in the spool having a circumferential turning surface longitudinally positioned to intercept the high velocity stream entering the groove when the valve spool is in a metering position;
    a circumferential diverging exit ramp tangentially positioned adjacent the turning surface, the exit ramp terminating with a maximum diameter forming an annular opening with the outside diameter of the spool which is at least 25 percent of the overall cross sectional area of the spool.

* * * * *